D. DI CARLO.
SPRING CONTROLLED MOTOR FOR OPERATING FANS OR OTHER SIMILAR DEVICES.
APPLICATION FILED MAR. 11, 1911.
998,757.
Patented July 25, 1911.
2 SHEETS—SHEET 1.
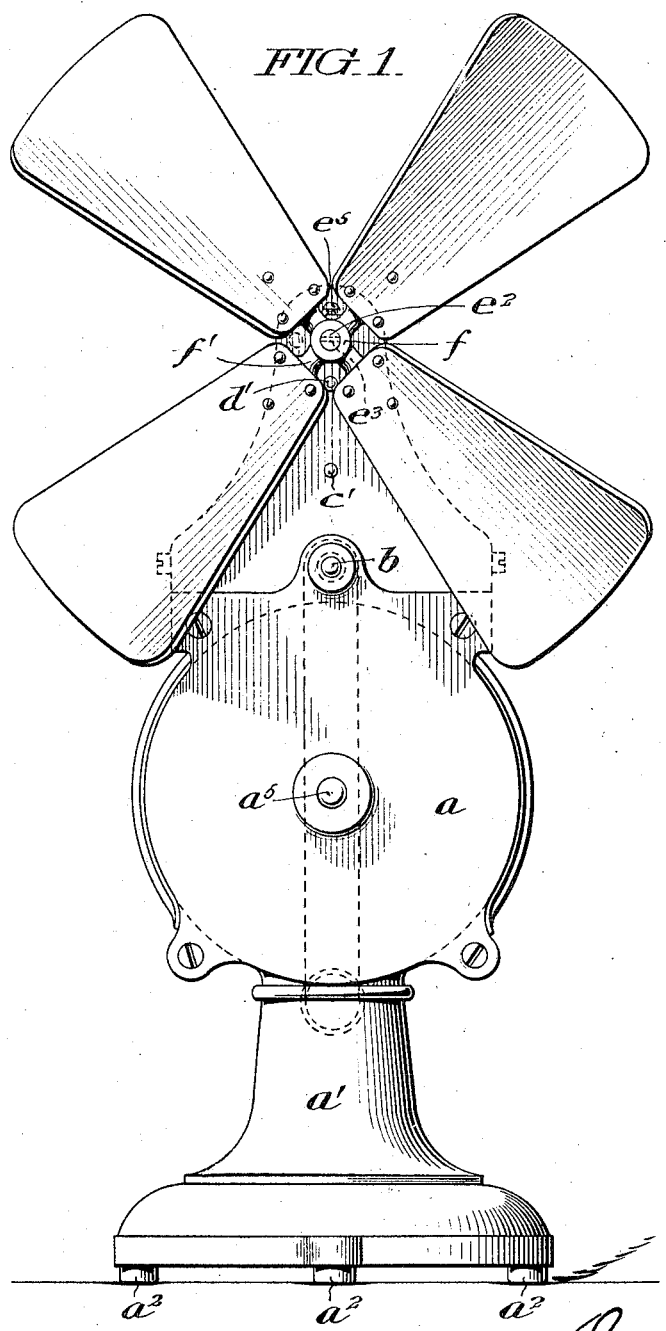

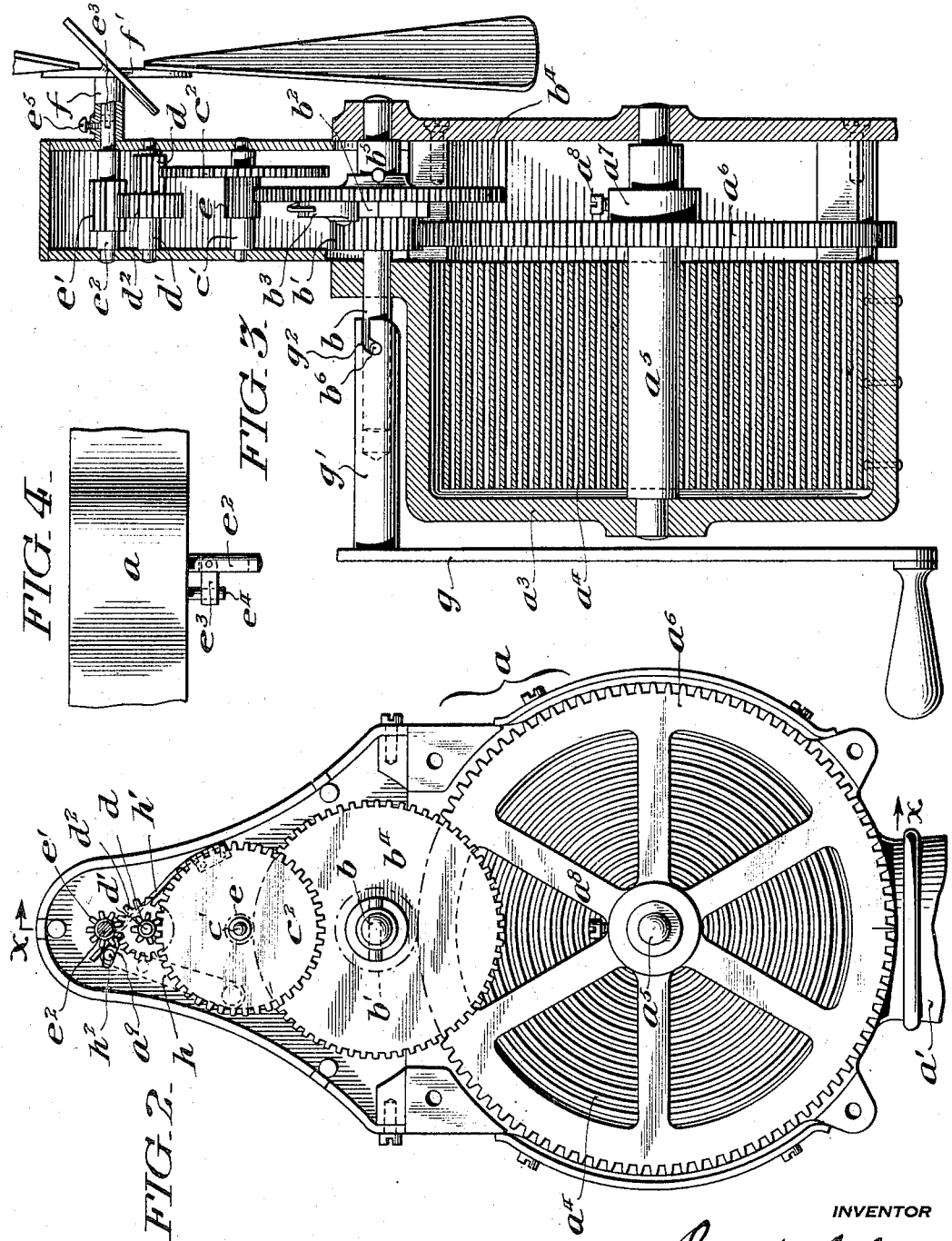

UNITED STATES PATENT OFFICE.

DONATO DI CARLO, OF PHILADELPHIA, PENNSYLVANIA.

SPRING-CONTROLLED MOTOR FOR OPERATING FANS OR OTHER SIMILAR DEVICES.

998,757.

Specification of Letters Patent.   Patented July 25, 1911.

Application filed March 11, 1911.   Serial No. 613,682.

*To all whom it may concern:*

Be it known that I, DONATO DI CARLO, a subject of the King of Italy, but now residing at the city of Philadelphia, in the county of Philadelphia and State of Pennsylvania, have invented certain new and useful Improvements in Spring-Controlled Motors for Operating Fans or other Similar Devices, of which the following is a specification.

My invention relates to a type of motor for the defined purposes, in which the power or energy is stored up through the compression of a spring; and in such connection my invention relates to certain particular features in the constructive arrangement of the motor actuating mechanism.

The nature and scope of my said invention will be more fully understood from the following description taken in connection with the accompanying drawings forming part hereof, in which—

Figure 1, is a front elevational view of a spring actuated motor arranged for operating particularly a blade fan; the said view in arrangement of the motor actuating mechanism, embodying the main features of my said invention. Fig. 2, is an enlarged fragmentary front elevational view of the motor of Fig. 1, but with the front plate removed, to expose internal working members thereof. Fig. 3, is a vertical central sectional view on the line $x, x$, of Fig. 2; and Fig. 4, is a fragmentary top or plan view of the motor, showing the stop-latch for the fan shaft so arranged as that when the hub of the blade-fan is removed, the latch can be readily extended to engage a pin of the housing so as to prevent turning of said shaft.

Referring to the drawings, $a$ is a housing for the actuating mechanism of the motor which housing is extended to provide a base $a^1$, having a series of feet $a^2$. The r r of the housing $a$, is formed into a circular box $a^3$, to receive a coiled spring $a^4$, which is mounted on a cross-shaft $a^5$.

$a^6$, is a large gear wheel, mounted on the shaft $a^5$, which is held thereon by means of a collar $a^7$, provided with a set screw $a^8$, to tighten the collar to position.

$b$, is the motor winding-shaft extending through the housing carrying a small gear-wheel $b^1$, meshing with the gear-wheel $a^6$.

$b^2$, is a ratchet-wheel, mounted on the shaft $b$, but secured to and revolving with a large gear wheel $b^4$, pinned through a collar $b^5$, to said shaft $b$, as clearly shown in Fig. 3. The ratchet-wheel $b^2$, is engaged by pawls or dogs $b^3$, arranged on one side of the gear-wheel $b^4$, one of the pawls or dogs $b^3$, holds the wheel $b^4$, in position against reverse rotation of the shaft $b$, while the other pawl or dog $b^3$, on the opposite side movably engages the gear-wheel $b^4$, to prevent any tendency to retrograde movement of said wheel, subject to the influence of the winding spring $a^4$, of the motor. The said gear-wheel $b^4$, in turn meshes with a pinion $e$, on a cross-shaft $c^1$, and upon which shaft is mounted a gear-wheel $c^2$. The gear-wheel $c^2$, in turn meshes with and rotates a pinion $d$, secured to a shaft $d^1$, which carries a gear-wheel $d^2$. This gear-wheel $d^2$, meshes with and rotates a pinion $e^1$, mounted on a shaft $e^2$. This shaft $e^2$, extends through the housing $a$, and is slitted and in which is pivoted a shiftable stop-latch $e^3$, arranged to engage a pin $e^4$, extending from the housing as shown in Fig. 4, so as to prevent rotation of the shaft $e^2$, when the hub $f$, carrying at the outer end a blade-fan $f^1$, or other appliance, is removed. The hub $f$, is held to the shaft $e^2$, by a tightening screw-bolt $e^5$, as clearly shown in Fig. 3. On the winding-shaft $b$, in rear of the upper portion of the housing $a$, is arranged a pin $b^6$, to engage a handle $g$, having a sleeve $g^1$, wherein is provided a bayonet connection $g^2$, to permit in connection with said pin of the shaft $b$, to be rotated to wind up the energy storing spring $a^4$, in the box $a^3$. On the back of the housing in the upper portion is arranged a manually operated pivotal hand-lever $h$, and within the housing is arranged a leaf-spring $h^1$, occupying normally a position, as shown between the pinions $d$ and $e^1$, as shown in Fig. 2. In the wall of the housing $a$, is provided an angular slot $a^9$, through which a pin $h^2$, of the hand-lever engages the said leaf spring $h^1$, to brake the fan-shaft to enable the speed of rotation of this shaft to be lessened or to prevent rotation of the fan or other appliance thereof, as may be required.

Having thus described the nature and objects of my invention, what I claim as new and desire to secure by Letters Patent is:—

1. In a spring controlled motor, a slitted cross-shaft extending from a housing, a latch pivotally held in the slit of said shaft and beyond said housing, a stop-pin extending from said housing and adapted when said latch is manually extended to prevent rotation of said shaft, a coiled spring having means for permitting of energy being stored up and mechanism controlled by said spring to revolve said slitted cross-shaft, when disengaged from said stop-pin.

2. In a spring controlled fan motor, a spring-shaft, a winding-shaft and a slitted fan-shaft, actuating means for said shafts, a latch pivotally held in the slit of said fan-shaft, a stop-pin projecting from a housing concealing working members of said motor and said pin arranged when said latch is manually extended from the slit of said shaft to prevent rotation of said fan-shaft and thereby of said spring and winding shafts.

3. In a spring controlled fan motor, a spring-shaft, a winding shaft and a fan-shaft mounted in a housing having a slot formed in the upper portion thereof, a hand lever carrying a pin extending through said slot, a spring controlled actuating gear and pinion mechanism for said shafts, a leaf spring arranged between certain of the pinions of said mechanism and said hand-lever arranged to be manually operated to cause the pin thereof to frictionally engage said spring with said pinions to retard the speed of said fan-shaft or to stop the rotation thereof.

In witness whereof, I have hereunto set my signature in the presence of two subscribing witnesses.

DONATO DI CARLO.

Witnesses:
 J. WALTER DOUGLASS,
 THOMAS M. SMITH.

Copies of this patent may be obtained for five cents each, by addressing the "Commissioner of Patents, Washington, D. C."